United States Patent
Rhee et al.

(10) Patent No.: US 10,929,539 B2
(45) Date of Patent: Feb. 23, 2021

(54) AUTOMATED SOFTWARE SAFENESS CATEGORIZATION WITH INSTALLATION LINEAGE AND HYBRID INFORMATION SOURCES

(71) Applicants: NEC Laboratories America, Inc., Princeton, NJ (US); NEC Corporation, Tokyo (JP)

(72) Inventors: Jungwhan Rhee, Princeton, NJ (US); Zhenyu Wu, Plainsboro, NJ (US); Lauri Korts-Parn, Princeton, NJ (US); Kangkook Jee, Princeton, NJ (US); Zhichun Li, Princeton, NJ (US); Omid Setayeshfar, Athens, GA (US)

(73) Assignee: NEC CORPORATION

( * ) Notice: Subject to any disclaimer, the term of this patent is extended or adjusted under 35 U.S.C. 154(b) by 257 days.

(21) Appl. No.: 16/040,086

(22) Filed: Jul. 19, 2018

(65) Prior Publication Data
US 2019/0050571 A1   Feb. 14, 2019

Related U.S. Application Data

(60) Provisional application No. 62/544,143, filed on Aug. 11, 2017.

(51) Int. Cl.
G06F 21/57 (2013.01)
H04L 29/06 (2006.01)
(Continued)

(52) U.S. Cl.
CPC .......... *G06F 21/57* (2013.01); *G06F 11/3466* (2013.01); *G06F 21/12* (2013.01);
(Continued)

(58) Field of Classification Search
CPC ........ G06F 21/57; G06F 21/12; G06F 21/552; G06F 21/56; G06F 21/561; G06F 21/562;
(Continued)

(56) References Cited

U.S. PATENT DOCUMENTS 7,822,620 B2   10/2010   Dixon et al.
8,374,973 B2   2/2013    Herbrich et al.
(Continued)

OTHER PUBLICATIONS

Microsoft.com "Applocker," https://docs.microsoft.com/en-us/windows/security/threat-protection/applocker/applocker-overview. Retrieved Mar. 26, 2018.

*Primary Examiner* — Kristine L Kincaid
*Assistant Examiner* — Alexander R Lapian
(74) *Attorney, Agent, or Firm* — Joseph Kolodka (57) ABSTRACT

Systems and methods are disclosed for enhancing cybersecurity in a computer system by detecting safeness levels of executables. An installation lineage of an executable is identified in which entities forming the installation lineage include at least an installer of the monitored executable, and a network address from which the executable is retrieved. Each entity of the entities forming the installation lineage is individually analyzed using at least one safeness analysis. Results of the at least one safeness analysis of each entity are inherited by other entities in the lineage of the executable. A backtrace result for the executable is determined based on the inherited safeness evaluation of the executable. A total safeness of the executable, based on at least the backtrace result, is evaluated against a set of thresholds to detect a safeness level of the executable. The safeness level of the executable is output on a display screen.

20 Claims, 7 Drawing Sheets

(51) Int. Cl.
*G06F 21/56* (2013.01)
*G06F 11/34* (2006.01)
*G06F 21/12* (2013.01)
*G06F 21/55* (2013.01)

(52) U.S. Cl.
CPC ............ *G06F 21/552* (2013.01); *G06F 21/56* (2013.01); *G06F 21/561* (2013.01); *G06F 21/562* (2013.01); *G06F 21/577* (2013.01); *H04L 63/1416* (2013.01); *H04L 63/1425* (2013.01); *G06F 2201/865* (2013.01); *G06F 2221/033* (2013.01); *H04L 63/145* (2013.01); *H04L 63/1433* (2013.01)

(58) Field of Classification Search
CPC ............... G06F 21/577; G06F 11/3466; G06F 2201/865; G06F 21/033; H04L 63/1416; H04L 63/1425; H04L 63/1433; H04L 63/145
See application file for complete search history.

(56) References Cited

U.S. PATENT DOCUMENTS

| | | | |
|---|---|---|---|
| 8,595,282 B2 | 11/2013 | Nachenberg | |
| 8,769,702 B2 | 7/2014 | Hulten et al. | |
| 9,058,493 B1* | 6/2015 | Gouesbet | H04L 67/02 |
| 9,135,433 B2 | 9/2015 | Green et al. | |
| 9,659,182 B1* | 5/2017 | Roundy | G06F 21/6281 |
| 2009/0113548 A1* | 4/2009 | Gray | G06F 21/552 726/24 |
| 2013/0254880 A1 | 9/2013 | Alperovitch et al. | |
| 2014/0223566 A1* | 8/2014 | Zaitsev | G06F 21/567 726/24 |
| 2015/0096018 A1* | 4/2015 | Mircescu | G06F 21/51 726/23 |
| 2015/0350232 A1* | 12/2015 | Liu | H04L 43/0876 726/23 |
| 2017/0237754 A1* | 8/2017 | Todorovic | G06F 21/00 713/156 |

* cited by examiner

AUTOMATED SOFTWARE SAFENESS CATEGORIZATION WITH INSTALLATION LINEAGE AND HYBRID INFORMATION SOURCES

RELATED APPLICATION INFORMATION

This application claims priority to U.S. Provisional Patent Application No. 62/544,143, filed on Aug. 11, 2017, incorporated herein by reference in its entirety.

BACKGROUND

Technical Field

The present invention relates broadly to cybersecurity, and more particularly to systems and methods for categorizing software safeness.

Description of the Related Art

Modern enterprise computers typically have many programs running simultaneously. For an organization with a multitude of computers, the total number of programs observed daily can be very high. With this scale of software dynamics, manual understanding and management of programs is very difficult given the limited resource of IT administrators. Therefore, in many cases enterprise computers end up running many unknown software, prohibited software, and even malicious software without clear oversight.

SUMMARY

According to an aspect of the present principles, a computer-implemented method is provided for enhancing cybersecurity in a computer environment by detecting a safeness level of an executable. The computer-implemented method identifies an installation lineage of an executable. Entities forming the installation lineage include at least an installer of the monitored executable, and a network address from which the executable is retrieved. Additionally, the computer-implemented method analyzes, individually, each entity of the entities forming the installation lineage using at least one safeness analysis. Results of the at least one safeness analysis of each entity are inherited by other entities in the lineage of the executable. A backtrace result is also determined for the executable based on the inherited safeness evaluation of the executable. The computer-implemented method evaluates a total safeness of the executable against a set of thresholds to detect a safeness level of the executable. The total safeness is evaluated based on at least the backtrace result. The safeness level of the executable is output on a display screen.

According to another aspect of the present principles, a system is provided for enhancing cybersecurity in a computer system by detecting a safeness level of an executable. The system includes a storage device configured to store program code and program information relating to an executable; and a processor operatively coupled to the storage device and configured to detect a safeness level of the executable by executing program code, stored on the storage device. The program code instructs the processor to identify an installation lineage of an executable. Entities forming the installation lineage include at least an installer of the monitored executable, and a network address from which the executable is retrieved. The program code also instructs the processor to analyze, individually, each entity of the entities forming the installation lineage using at least one safeness analysis. Results of the at least one safeness analysis of each entity are inherited by other entities in the lineage of the executable. Additionally, the program code instructs the processor to determine a backtrace result for the executable based on the inherited safeness evaluation of the executable. Moreover, the program code instructs the processor to evaluate a total safeness of the executable against a set of thresholds to detect a safeness level of the executable. The total safeness is based on at least the backtrace result.

The system also includes a display screen having a graphical user interface implemented by the processor and displayed on the display screen, the graphical user interface configured to present the safeness level of the executable, and accept feedback overriding the safeness level of the executable.

According to another aspect of the present principles, a computer program product having a non-transitory computer readable storage medium with program instructions embodied therewith is for enhancing cybersecurity in a computer environment by detecting a safeness level of an executable. The computer-implemented method identifies an installation lineage of an executable. Entities forming the installation lineage include at least an installer of the monitored executable, and a network address from which the executable is retrieved. Additionally, the computer-implemented method analyzes, individually, each entity of the entities forming the installation lineage using at least one safeness analysis. Results of the at least one safeness analysis of each entity are inherited by other entities in the lineage of the executable. A backtrace result is also determined for the executable based on the inherited safeness evaluation of the executable. The computer-implemented method evaluates a total safeness of the executable against a set of thresholds to detect a safeness level of the executable. The total safeness is evaluated based on at least the backtrace result. The safeness level of the executable is output on a display screen.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with present principles, systems and methods are described for automated software safeness categorization with hybrid information sources. The systems and methods include components embodied and executed by user machines, such as desktop computers, laptop/notebook computers and mobile devices.

In accordance with present principles, each user machine may be tasked with monitoring the activity of programs installed on the user machine. The user machine records executable information, executable signatures, developer signatures, process behavior, file behavior and network behavior for each monitored program while the program is running.

Moreover, an installation lineage record is maintained for each monitored executable. The lineage record provides a back-trace of programs and network addresses that caused the executable's installation on the user machine. For example, the installation lineage record identifies the installer program that installed the executable, the browser that downloaded the installer, and the Internet Protocol (IP) address or other network address from which the browser downloaded the installer. Additionally, the lineage record may track dependencies of the executable, e.g., the programs from which it depends, as well as other executables, and even shared libraries, that depend from the current executable.

There are situations where multiple programs use the same executable; this is often the case with operating systems such as UNIX® and Linux™, where command line executables are controlled by graphical user interface frontends. In those situations, an executable may have been installed by a first software package, but later used by a second software package. Because the second software package uses the executable, even when the first software package is removed from the computer system, the executable may remain. Thus, over time, the lineage of the executable may become difficult to track. Consequently, an aspect of the present principles maintains a record of the installation lineage of the executable.

In accordance with present principles, the executable information and installation lineage record is used to determine an executable's safeness category, e.g., safe, unsafe and unknown. However, additional gradations or categories may be implemented as appropriate without departing from the present principles.

In accordance with the present principles the installation lineage record of the executable is analyzed in order to evaluate the safeness of the programs and network addresses from which the executable depends. Each of the programs and network addresses listed in the installation lineage record are evaluated for safeness using the same analytical tools described below. The safeness results are combined and inherited by the executable in a backtrace score.

Inside the executable, embedded information may be present that references the executable's origin such as the network address from where the software is downloaded and the downloader that downloaded the given software. The reputations of the downloader and network addresses are collected in the same manner as described above for the dependency backtracing. The executable inherits the reputations of these embedded programs and network addresses. Thus, if the network address is blacklisted, the executable will receive a corresponding score.

Various additional analyses may be performed, in accordance with the present principles, using the executable information and installation lineage record to further enhance the reliability of the safeness determination.

The present principles provide for feedback once the executable has been evaluated for safeness by the analyses, as described herein. A graphical user interface is presented on a display screen. By way of the graphical user interface, an administrator, or operator, may review the results of the various analyses performed on the executable, as well as detailed information regarding the executable. Upon review of the executable and its safeness results, the administrator may overrule the safeness determination or provide additional information. The feedback for the executable is saved and used in future safeness evaluations of the executable as well.

Figure 1:
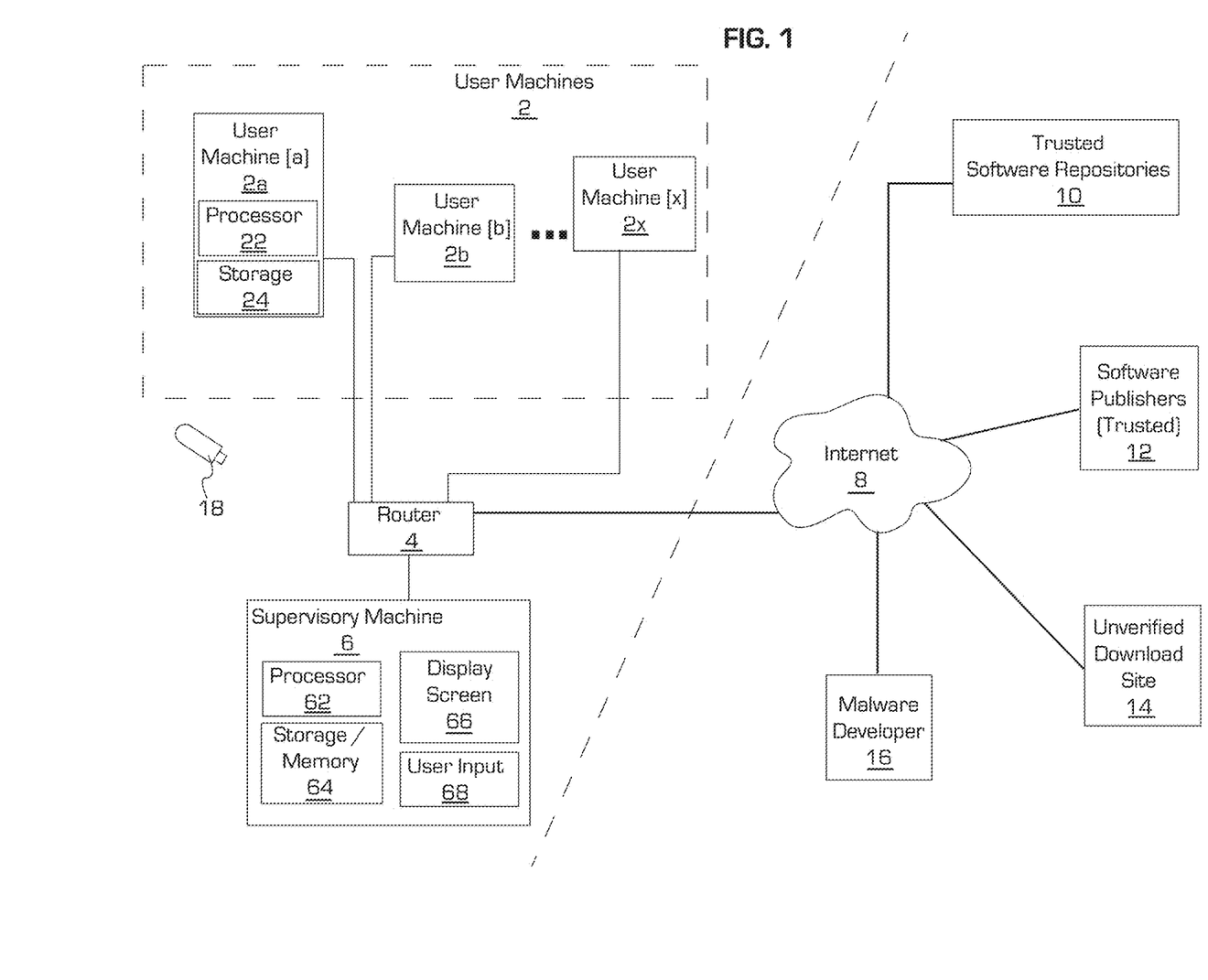
FIG. 1 is a block/flow diagram illustrating a high-level system/method for automated software safeness categorization, in accordance with an embodiment.

Turning now to the figures, as shown in FIG. 1, an enterprise, such as a corporation, university, governmental agency, or any similar organization, is configured with several user machines 2*a*-2*x* (collectively referred to as user machines 2). The user machines 2, may be any combination of desktop computer systems, laptop computers, tablet computers, mobile devices (e.g., smartphones), kiosks, networked printers, smart appliances, smart televisions, or any other networkable device that executes programs or firmware instructions. It is also noted that the user machines 2 are generally equipped with storage 24 configured to store a program, such as a hard drive, or solid-state memory, and a processor 22 configured to execute instructions and functions embodied in the program.

The user machines 2 are in communication with one another either directly, as in an ad-hoc peer-to-peer network, or indirectly through a server-client configuration. Any other appropriate networking schemes are also contemplated by the present principles. In the present embodiment, a router 4 implements the network backbone and provides access to the Internet 8.

In addition to the user machines 2, a supervisory machine 6 is coupled to the network by way of the router 4. The supervisory machine 6 may be a dedicated server, desktop computer, laptop, etc. having the requisite computing power and capabilities necessary to execute the supervisory functions in accordance with the present principles as described below. Alternatively, the supervisory machine 6 may be one of the user machines 2 tasked with the additional role of performing the supervisory functions.

The supervisory machine 6 is configured with a processor 62, storage/memory 64, a display screen 66 and user input devices 68, such as keyboard, mouse, touch component of the display screen 66 or any combination of these devices.

Software is often acquired, installed and upgraded by way of the Internet 8, or other network. For example, software may be downloaded from a trusted software repository 10. Such a software repository is considered trusted if it scans software uploaded thereon for malware and viruses at an acceptable level. Additionally, software publishers 12 are considered as another source of trusted software. It should be noted that not all software publishers 12 are equally trusted. Publishers of major commercial software packages may be considered highly trusted, while smaller or lesser known publishers may be regarded as less trusted.

Unverified download sites 14 are similar to the trusted software repositories 10, except that unverified download sites 14 may not perform malware and virus detection scans of the software being served or the scans performed may not reliably detect malware and viruses. Thus, software packages downloaded from unverified download sites 14 may be one of the entry points from which malicious programs can enter an enterprise environment.

Furthermore, software may be downloaded directly from a malware developer 16. This situation may occur when a malware developer 16 provides a website that appears to be a legitimate site. Alternatively, this situation may occur without a user's knowledge, as when a hijacked executable downloads additional malware in the background without notification being provided to the user.

Still another source of software in an enterprise environment is by way of removable media 18, for example flash drives connectable to the user machine's 2 Universal Serial Bus (USB). This software source may be considered as an unverified software source since the provenance of the software may be unknown.

Figure 2:
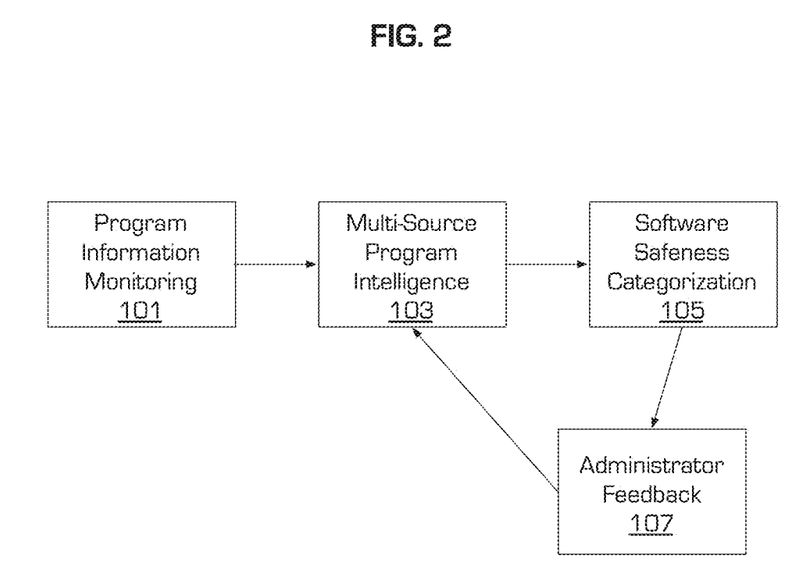
FIG. 2 is a block/flow diagram illustrating a high-level system/method for automated software safeness categorization, in accordance with the present principles.

Referring to FIG. 2, for a given program, its executable, signature, and its behavior are monitored at block 101 and collected as program information. The program information gathered in block 101 may be recorded in a flat file, database or other appropriate information container. The multi-source program intelligence utilizes multiple sources to analyze the program and its program information in block 103. Based on the multi-source analyses performed in block 103, the software is categorized into safeness categories at block 105 and presents the output to an operator at block 107. The operator may choose to manually adjust the categorization of an individual software at block 107. Any changes made by the operator at block 107 are reflected in the multi-source program intelligence at block 103.

Figure 3:
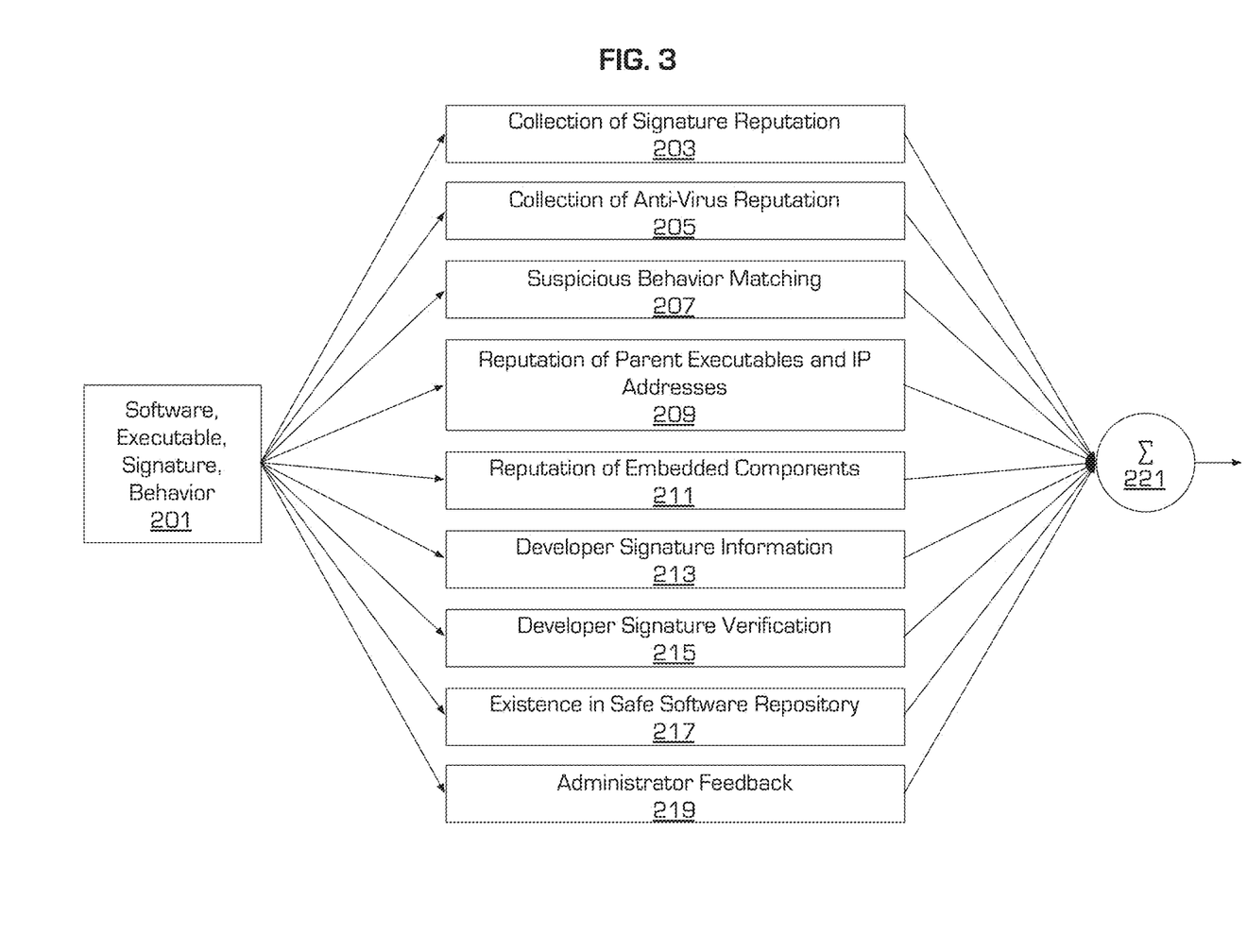
FIG. 3 is a block/flow diagram illustrating a system/method implementing a multi-source program intelligence, in accordance with the present principles.

As described above, the program information is passed to the multi-source program intelligence. FIG. 3 illustrates the processing of the multi-source program intelligence information 201 by the software safeness categorization (represented by blocks 203 through 221). The multi-source program intelligence evaluates the program information 201 using various analytical tools 203 through 219, as will be described below. Scores are assigned to the results of each analysis. An aggregated score is calculated at block 221 from the collected scores received from the various analytical tools 203 through 219.

In an embodiment, the scores may include a weighting, or importance factor. The weightings applied to the score of each analysis may be multiplicative factors between 0 and 1, for example, and indicative of the reliability of the analysis in detecting a suspicious program. Thus, each analysis score is multiplied by its respective weighting value. In other embodiments, alternative methods of adjusting the scores of each analysis to reflect the ability of the analysis to reliably identify suspicious programs may be used. Within the scope of the present principles any such methods are also contemplated as weightings, or importance factors, as well. In embodiments, the weightings applied to each analysis may be predefined. In other embodiments, the weightings may be adjustable by a user. In an embodiment, each analysis may have a different weighting. The embodiments disclosed herein illustrate the present principles using weighted scores; however, it will be apparent to one of ordinary skill in the art that the present principles can be implemented without weighted scores as well.

In accordance with present principles, the executable signature can be used to verify the executable as being authentic in block 203, and a score can be assigned to the executable based on the verification status. The executable signature may include an alphanumeric checksum generated, based on contents of the program, by a hash function. Consequently, the signature is unique to a specific software and version. With respect to present principles, the signature may be a checksum calculated by the user machine after installation or update of a program.

The executable signatures are referenced against executable signature databases to determine the reputation of the executable, at block 203. The executable signature reputation analysis, in block 203, calculates the reputation values of the executable signatures such that an executable signature that is determined, at step 203, to be a malware or blacklisted software may receive an executable signature score of (e.g., +1 multiplied by an executable signature importance factor). An executable signature determined, at step 203, to be a benignware or whitelisted software may receive an executable signature score of (e.g., −1 multiplied by an executable signature importance factor). An executable signature that cannot be verified, at step 203, as either safe or unsafe may receive an executable signature score of zero.

With respect to present principles, the term checksum as used herein refers to any functions that produce unique finite length alphanumeric strings calculated based on the contents of a program. The checksum may be calculated using algorithms such as MD5, SHA, CRC32, or any other hash function algorithm as known in the art. Each user machine 2 may use the same algorithm when calculating the signature so that identical program versions on different user machines 2 will have identical signatures.

Each signature and executable is examined by multiple anti-virus software in block 205. Each anti-virus software provides a separate result. Each anti-virus software has its own strengths and weaknesses based on the algorithms employed. Thus, by using multiple anti-virus software, in block 205, the present principles take advantage of the strengths of each of the anti-virus software and arrive at a more accurate evaluation of the executable. For example, a particular anti-virus program may present a false positive (e.g., incorrectly indicating that a program contains a virus). However, by using multiple anti-virus programs, in block 205, the false positive as well as possible false negatives may be averaged out. Thus, providing a more reliable result.

In an embodiment, the results received, at step 205, from each anti-virus software can fall into number of values. For example, if the executable is a malicious/blacklisted software, the executable may receive a +1. If the executable is a benign/whitelisted software, the executable may receive a −1. If the executable is neither of the two cases, the executable may receive a zero. The scores from all the anti-virus programs may be averaged and multiplied by an anti-virus importance factor to obtain a weighted anti-virus score. In an embodiment, the results from the anti-virus programs may be individually weighted and summed together, rather than averaged.

The suspicious behavior matching in block 207 includes a predefined list of suspicious behaviors. The process, file and network behavior components of the executable information may be utilized to track unusual or suspicious behavior of the executable in block 207. A database of predefined suspicious behavior may be maintained, in accordance with present principles, and used to match similar behaviors in executables in block 207.

The suspicious behavior database used in block 207 may be configured to include process behaviors, file behaviors and network behaviors. Alternatively, individual databases may be maintained for each category of behavior. Thus, a suspicious process behavior database, a suspicious file behavior database and a suspicious network behavior database may be separately maintained and used in block 207. With respect to the present principles, the list of suspicious process behaviors, file behaviors and network behaviors whether presented in multiple databases or in one database, are referred to collectively as "suspicious behavior database".

The suspicious behavior matching in block 207 compares the program's process, file, and network behavior against the list of suspicious behaviors. The suspicious behavior score is derived based on the number of matched suspicious behaviors identified by the suspicious behavior matching in block 207. Thus, a suspiciousness score may initially be set to zero. However, for each suspicious behavior match in block 207, the suspiciousness score may be incremented by 1. The final weighted suspicious behavior score may be the suspiciousness score multiplied by a suspiciousness importance factor.

The function of the executable may be considered, as well, when determining if a behavior is suspicious, in block 207. A behavior that can be considered suspicious in one type of program may be considered normal for another type of program. For example, an email program periodically accessing the Internet may not be considered suspicious in block 207, however the same behavior from a basic text editor, for example, may appear highly suspicious. Thus, in an embodiment of the present principles, context may be considered when evaluating and scoring suspicious behavior in block 207.

Moreover, the user machine on which the executable is performing the behavior may also be considered in block 207. For example, certain users may have broader privileges to access files or perform particular network behaviors, even with atypical executables, while other users do not have such privileges. Thus, an executable's behavior that may be considered suspicious on one user machine, may be considered normal when carried out on another user machine. Consequently, in an embodiment of the present principles, the suspicious behavior matching analysis, at block 207, may take into consideration, not only the behavior observed, but also the type of executable performing the behavior and the user machine on which the behavior is observed.

Figure 4:
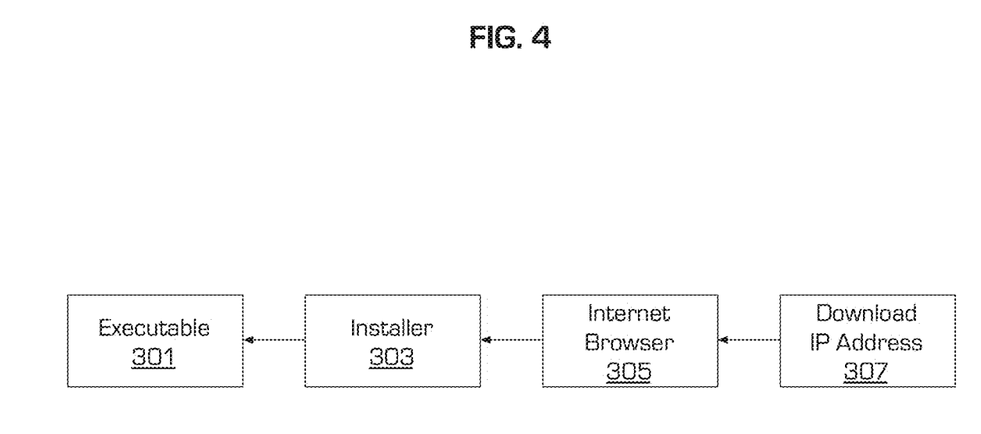
FIG. 4 is a block diagram illustrating an executable dependency analysis, in accordance with the present principles.

The reputation of dependent executables and network addresses is determined at block 209. The process at block 209 back-traces the executable dependency so that an installation lineage regarding an install process of the executable may be identified that shows how the executable is introduced into the system. The process at block 209 evaluates the reputation of the dependent software and network addresses (collectively referred to as installation lineage entities) at block 209. FIG. 4, described below, illustrates an example of an installation lineage.

In an embodiment, each reputation of a program or a network address may have one of three values, +1 for malicious/blacklisted, −1 for benign/whitelisted, and zero for unknown status. The present principles contemplate using other values as well. In an embodiment, the reputation (safeness determination) of each installation lineage entity is inherited by entities depending therefrom, including the executable being monitored. As an example, an executable that has been installed from a network address that is blacklisted can inherit the blacklist status as well. Conversely, an executable can inherit a beneficial determination from an installer or network address that is determined to be whitelisted, for example.

Furthermore, embodiments of the present principles may attenuate the inherited safeness. Thus, for example, while an executable installed by way of a blacklisted installation lineage entity may inherit the blacklisting as well, an executable that is installed by way of a whitelisted installation lineage entity may not inherit the full benefit of the whitelisting. The attenuation of the inheritance may be implemented as a weighted factor combined with the inherited safeness determination. Moreover, in embodiments, the inherited safeness determinations from multiple installation lineage entities may be averaged prior to being weighted. Alternatively, the safeness determinations may be individually weighted and then combined either by averaging or any other appropriate algorithm.

Thus, in the present embodiment represented in FIG. 3, the values from each program and network address may be averaged together and multiplied by a dependency importance factor to generate a weighted backtrace score at block 209.

Referring to FIG. 4, an example is shown in which a program 301 is installed by an installer program 303, which is downloaded by an Internet browser 305 from a network address 307. By following the installation behavior, a list of dependent binaries (e.g., the installer 303 and the browser 305) and the network address 307 may be collected. In an embodiment, the list of dependent binaries may not be limited to the installer 303 and the browser 305, but may also include libraries, data files and other computer code installed at the same time as the executable.

Inside the software executable, information on the executable's download origin such as the network address from where the software is downloaded and the downloader that downloaded the executable may be embedded. This information may be referred to as embedded install information. The reputation of the embedded install information is collected in block 211.

Figure 5:
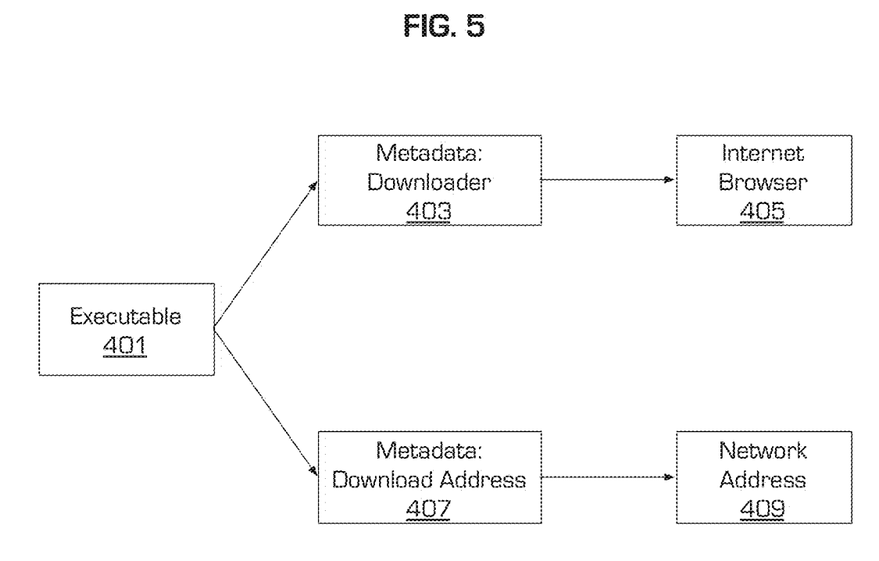
FIG. 5 is a block diagram illustrating an embedded dependency analysis, in accordance with the present principles.

FIG. 5 illustrates an example of embedded installation information in an executable. Referring to FIG. 5, program 401 has metadata (embedded install information) 403 regarding its downloader 405 and metadata (embedded install information) 407 regarding the download address 409. The process collects the reputation of the downloader 405 and download address 409.

Turning back to FIG. 3, each component (e.g., downloader, network address, etc.) of the embedded install information, at block 211, may receive one of three values, +1 for malicious/blacklisted, −1 for benign/whitelisted, and zero signifying an unknown status or that no embedded install information is present. The values from each component may be averaged together, in block 211, and multiplied by an embedded importance factor to generate a weighted embedded score.

In an embodiment, the embedded install information may be considered as a subset of the installation lineage entities. Thus, the embedded install information may be evaluated in the same manner as other lineage entities, and its safeness determination incorporated into the backtrace score assigned in block 209, as well.

Executables may be signed by their developers using a cryptographic signature unique to each developer. Therefore, an embodiment may collect the developer signing information for the executable at block 213. If the software is securely signed by the developer, the executable may receive a weighted developer score of 0. However, if the executable is not securely signed by the developer, the received weighted developer score may be +1 multiplied by a developer signature importance factor.

The developer signature verification at block 215 determines whether the developer signature is verified or not. Since the developer signature is a cryptographic signature, it is generally difficult to falsify. Thus, verification of the developer signature, at block 215, may confirm that the executable originated with that developer. A weighted developer signature reputation score may be assigned to the executable based on the verification of the developer signature, at block 215. If the developer signature is verified in block 215 the executable may receive a weighted verified developer score of 0, while unverified developer signatures may receive a weighted verified developer score of +1 multiplied by a developer verification importance factor.

In an embodiment, verified developer signatures may be further ranked based on the developer's history software vulnerabilities or hijackings in the past. Thus, executables from developers with good track records of cybersecurity and lack of vulnerabilities in their software may be assigned a lowest verified developer score (for example, −5). Conversely, executables from developers with less consistent track records of cybersecurity and/or frequent vulnerabilities in their software may be assigned higher verified developer scores (for example, between −4 and −1, inclusively).

Safe software repositories may be searched in block 217 to determine if the executable is hosted by a safe software repository. A safe software repository is a software hosting site (e.g., website, File Transfer Protocol (FTP) site, version control system repository, etc.) that perform independent virus/malware inspections of software hosted thereon. If the executable is found on one or more safe software repositories at block 217, a weighted repository score of zero may be given at block 217. Otherwise, the executable may receive a weighted repository score of +1 multiplied by a repository importance factor at block 217.

The present embodiment permits an information technology (IT) administrator, or operator, to provide feedback at block 219. Thus, the operator may choose to label the executable as malicious/blacklisted, in which case the executable may be assigned a weighted feedback score of +1 multiplied by a feedback importance factor at block 219. If the operator chooses to label the executable as benign/whitelisted, the executable may be assigned a weighted feedback score of −1 multiplied by the feedback importance factor at block 219. Alternatively, the operator may choose to label the executable as unknown, in which case the executable may be assigned a weighted feedback score of zero at block 219.

The multiple scores from blocks 203 through 219 may be aggregated and compared with thresholds to produce the safeness categorization of the executable at block 221. To combine multiple scores, a combination function may be used. For example, the combination function may be a simple summation of all the individual scores. However, any appropriate function may be used in block 221 to combine the scores from the various analyses as dictated by the particular implementation without departing from the present principles.

The present embodiment is described with high scores indicating unsafe executables while low scores indicate safe executables. As noted above, the present principles contemplate using either a high score or a low score to indicate the safeness of an executable.

With respect to the scoring conventions used throughout the present embodiment, the values −1, zero and +1 are intended as examples only. The values will be understood by one of ordinary skill in the art as representative of a low, mid and high range value. Moreover, the values used may be any values that adequately represent a low ranking, a middle ranking and a high ranking. The range of values are not intended to be limited to three, rather are used herein to simplify the description of the present principles. Additional values may be used, for example the values used may be in the range of −10 to +10, or in the range of −100 to +100 without departing from the present principles. Moreover, the values may be exclusively positive numbers, or may include fractional numbers without departing from the present principles.

In accordance with the present principles, the weighted scores derived from each analysis performed on the executable are combined to calculate an aggregated score. The executables are ranked by the aggregated score. The executables with aggregated scores higher than a defined "unsafe threshold" are reported as alarms.

The multiple weighted scores are aggregated and then the safeness categorization of the software is determined. An aggregation function is used to combine the weighted scores from multiple sources (e.g., multiple analyses). Due to the diverse information sources, the present principles can increase the coverage of software that can be analyzed for safeness, increase responsiveness to new software, and potentially detect unsafe software sooner.

In an embodiment, software may be sorted into Safe, Unsafe and Unknown categories. Safe software (e.g., white listed software) is considered safe based on the combination of scores. Unsafe software (e.g., black listed software is considered unsafe such as malicious software, vulnerable software, or buggy software based on the scores. unknown software has safeness that is not clear due to lack of intelligence.

The present principles contemplate fixed threshold values for determining safe and unsafe software. Additionally, the present principles contemplate wherein the thresholds for determining safe and unsafe software are adjustable by an IT administrator. Further, the present principles contemplate having a set of preset threshold values that are selectable by the operator based on risk aversion of the enterprise.

It is noted that often programs may have multiple executables as is the case where a program acts as a front-end to a suite of executables implemented as extensions or plugins of the program. In such a case the present principles contemplate monitoring the multiple executables associated with the program.

Additionally, the present principles are equally applicable to non-executable software components such as resource files, data files and shared libraries. Thus, even though the present principles are described herein with embodiments referencing executables, one of ordinary skill in the art will readily appreciate that the non-executable components of a program may also be evaluated for safeness using the present principles.

Figure 6:
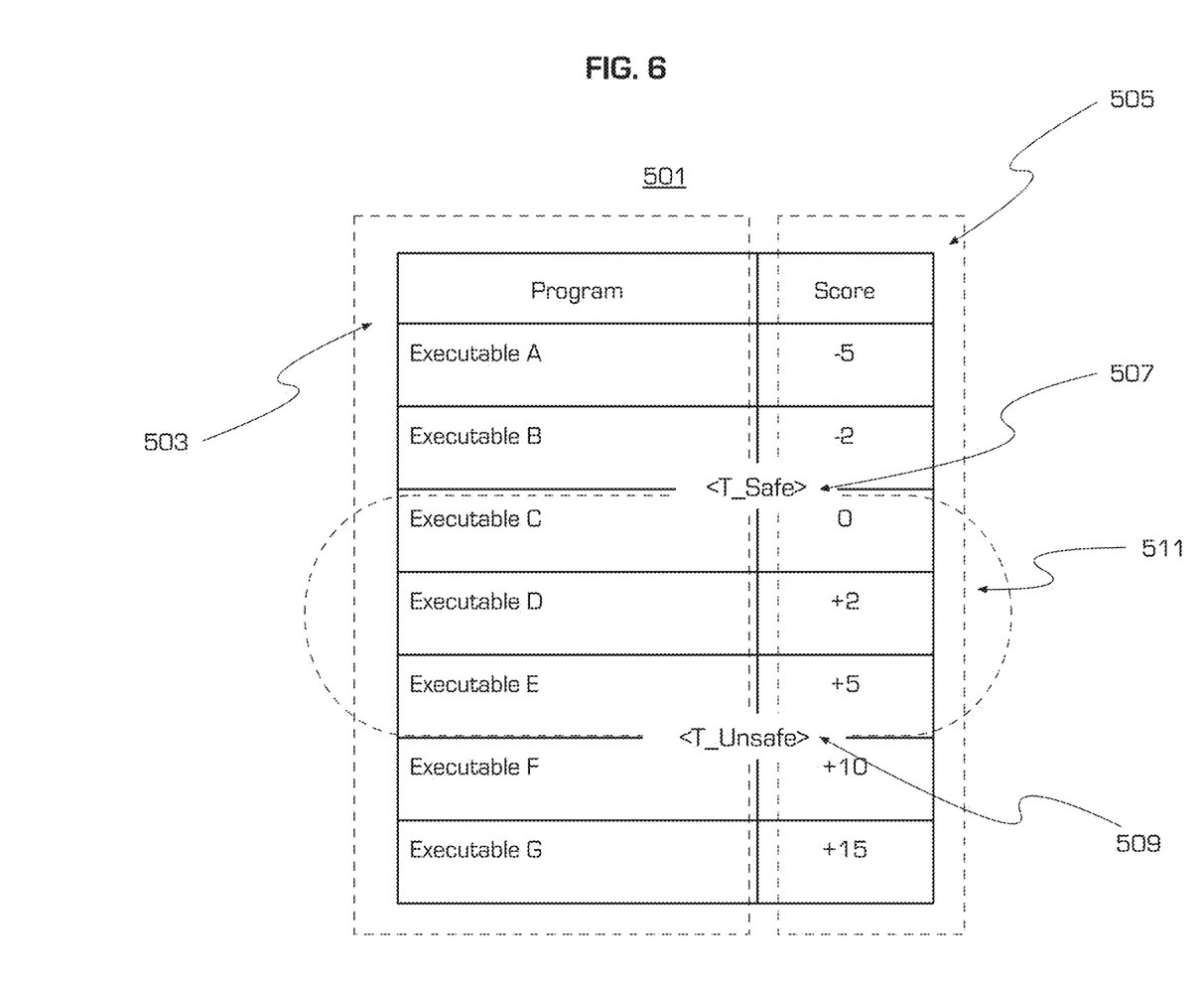
FIG. 6 is a block representation of a graphical interface displaying results of the automated software safeness categorization, in accordance with the present principles.

IT administrators may want the ability to review the results of all the programs installed on an enterprise environment. Consequently, the embodiment, as described above with respect to FIG. 3, is applied to each program installed on the enterprise environment. The results of the analyses may be presented to the IT administrator in the form of a graphical user interface that includes an ordered table 501, as shown in FIG. 6. The programs 503 and corresponding scores 505 are ranked in ascending order based on the respective program's score 505. Moreover, for easy identification of safeness categorization of the programs and scores, delineating markers 507, 509 may be present on the table 501 marking the safe score threshold (T_Safe) 507 and the unsafe score threshold (T_Unsafe) 509. Alternatively, the table entries may be color coded based on the safeness categorization, e.g., red for unsafe, yellow for unknown, and green for safe. The safeness categories of the present principles, however, are not limited to three (safe, unsafe, and unknown), but rather may include additional levels of safeness, as appropriate for particular implementations and environments.

The top rows whose scores are less than T_Safe 507 may be categorized as safe programs, and the bottom rows whose scores are greater than T_Unsafe 509 may be categorized as unsafe programs. The programs between these two groups may be considered as a group of unknown programs 511.

In the embodiment shown in FIG. 6, the T_Safe 507 may be set at, for example, a value of zero, thus any executable having a score lower than zero may be considered safe. Additionally, T_Unsafe 509 may be set at, for example, a value of +7, thus any executable having a score greater than +7 may be considered unsafe.

Thus, in the ordered table 501, shown in FIG. 6, Executable A, with a total safeness score of −5, and Executable B, with a total safeness score of −2, are considered to be safe for use in the enterprise environment. On the other hand, Executable F, with a total safeness score of +10, and Executable G, with a total safeness score of +15, are considered to be unsafe for use in the enterprise environment. Thus, Executable F and Executable G may be marked for deletion, in accordance with the present principles.

In the present embodiment, executables having scores between T_Safe 507 and T_Unsafe 509 (e.g., scores between zero and +7) may be classified as having an unknown safeness. In an embodiment, such executables of unknown safeness may be quarantined until a final determination is made as to their safeness by an IT administrator, for example. Thus, in the ordered table 501 Executable C, with a total safeness score of zero, Executable D, with a score of +2, and Executable E, with a score of +5, may all be categorized as being of unknown safeness 511. Consequently, Executable C, Executable D and Executable E may be quarantined, thus preventing the executables from operating and potentially causing damage to the enterprise environment.

The graphical user interface may allow an operator to select a program entry within the ordered table 501 to view detailed information regarding each of the analyses' raw output, in addition to the safeness scores 505 of the programs 503. The detailed information may be displayed in a separate graphical element, such as a pop-up window (not shown). Since safe and unsafe software are already categorized, the operator need spend much less time evaluating installed software by focusing attention on manual examination of the software in the unknown safeness category 511 instead.

Additionally, the operator may wish to manually override the safeness categorization of a certain program. Thus, the user interface may be provided to allow input of feedback from the operator by, for example, manually changing the score assigned to an executable listed in the ordered table 501. For example, an operator, upon manual evaluation of the detailed information for executable C listed in the unknown safeness category 511, may decide to promote executable C to the safeness category. The promotion may be performed by the graphical interface allowing the score corresponding to executable C to be changed by the operator from 0 to any value lower than the T_Safe 507 threshold value. Any labeling or actions, performed by the operator, are stored so that the labeling/action can be considered by the multi-source program intelligence in future analyses of the same executable.

Figure 7:
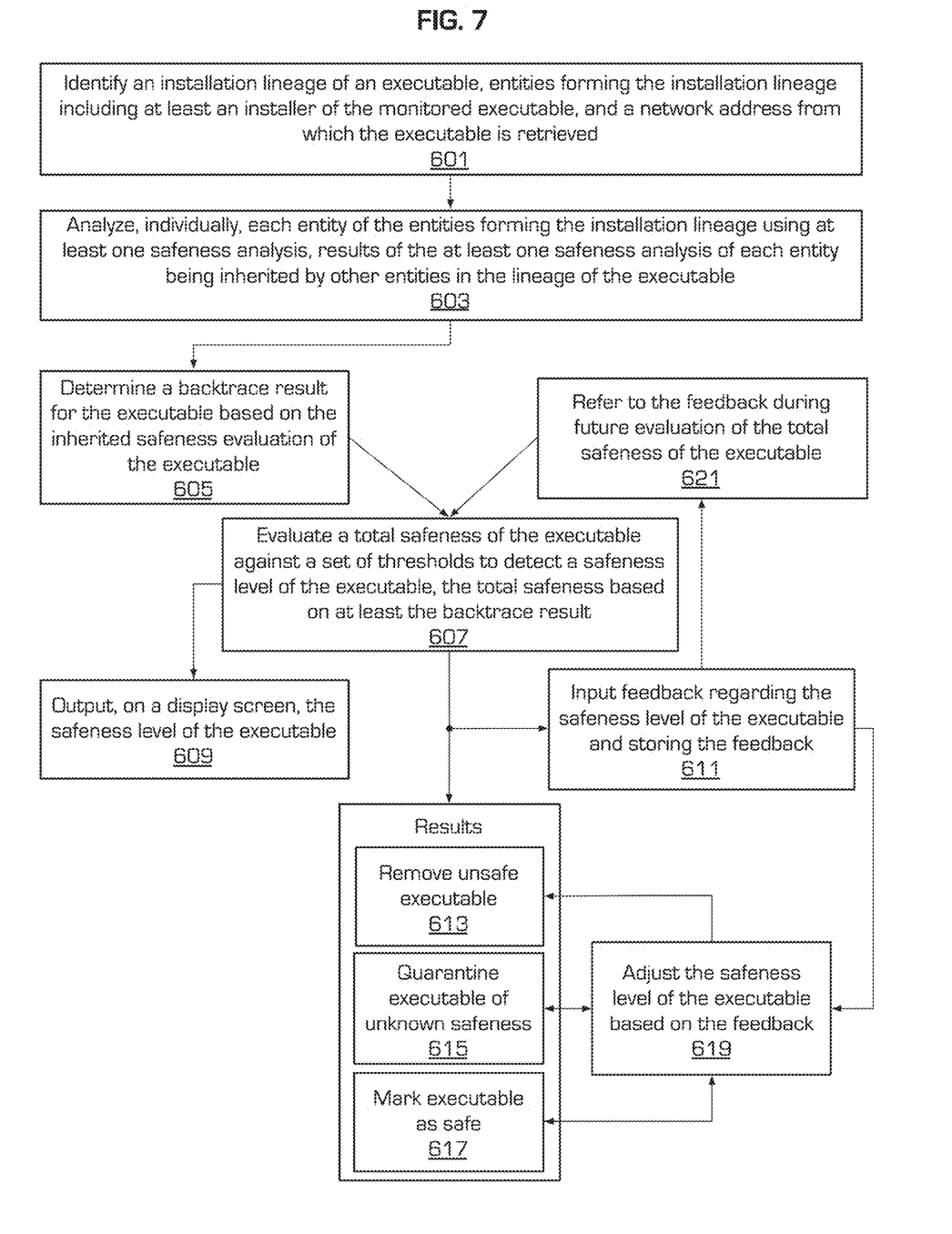
FIG. 7 is a block/flow diagram illustrating a system/method for automated software safeness categorization, in accordance with an embodiment.

In an embodiment shown in FIG. 7, a computer-implemented method, performed by a processor 62 (FIG. 1) in accordance with present principles, identifies an installation lineage of an executable, in block 601. Entities forming the installation lineage include at least an installer of the monitored executable, and a network address from which the executable is retrieved.

The method, performed by the processor 62, analyzes, individually, each entity of the entities forming the installation lineage using at least one safeness analysis, in block 603. The results, in block 603, of the at least one safeness analysis of each entity is inherited by other entities in the lineage of the executable. In an embodiment, the at least one safeness analysis is selected from one or more of the analyses described above with respect to FIG. 3. The processor 62 determines a backtrace result for the executable, at block 605, based on the inherited safeness evaluation of the executable.

Moreover, the processor 62 evaluates a total safeness of the executable against a set of thresholds to detect a safeness level of the executable, at block 607. In an embodiment the total safeness evaluated by the processor 62, at block 607, is based on at least the backtrace result. In an embodiment, the total safeness is based on the backtrace result and respective results of the at least one safeness analysis, such as one or more analyses described above with respect to FIG. 3.

In an embodiment, the processor 62 selects the safeness level from at least one of: safe, unsafe and unknown, at block 607. In an embodiment, the computer-implemented method may instruct the processor 62 to quarantine software marked with an unknown safeness level in block 615. In an embodiment, software marked as unsafe may be removed (e.g., uninstalled) from the user machines 2 by the processor 62 at block 613. In an embodiment, software determined to be safe may be marked as safe at block 617 and allowed to operate on the user machines 2 as normal. Additionally, the processor 62 outputs the safeness level of the executable on a display screen 66, at block 609.

The computer-implemented method also includes inputting, on a user interface using a user input 68, feedback regarding the safeness level of the executable at block 611. The feedback is stored, in memory 64, and in association with the executable at block 611, so that the feedback associated with the executable can be referenced, at block 621, during future evaluation by the processor 62 of the total safeness of the executable at block 607. Additionally, the safeness level of the executable may be adjusted by the processor 62 at block 619, based on the feedback stored in block 611.

Quarantined software remains in quarantine until an operator adjusts the safeness level of the software at block 619 from unknown safeness to either safe, in which case the software is marked as safe in block 617 and released from quarantine, or unsafe, at which point the software is passed from block 615 to block 613 and is permanently removed from the user machines 2. In an embodiment, an operator may, at block 619, adjust the safeness level of an executable marked as safe in block 617 as well, such that the software may be reclassified as either: unknown and quarantined in block 615, or unsafe and removed at block 613.

With respect to the present principles, the terms "application", "program" and "software" are used interchangeably to mean one or more related executables, where an executable is understood to mean a, usually precompiled, set of instructions readable by a computing device for instructing the computing device to perform one or more functions or tasks. Additionally, the term "binary" is used interchangeably with "executable" as well with respect to the present principles.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid-state memory, magnetic tape, a removable computer diskette, a random-access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for enhancing cybersecurity in a computer environment by detecting a safeness level of an executable, comprising:
    identifying an installation lineage of any type of executable, entities forming the installation lineage including at least an installer of the executable, and a network address from which the executable is retrieved;
    analyzing, individually, each entity of the entities forming the installation lineage using at least one safeness analysis, results of the at least one safeness analysis of each entity being inherited by other entities in the lineage of the executable;
    determining a backtrace result for the executable based on an inherited safeness evaluation of the executable, the backtrace result being determined by collecting and analyzing reputations of dependent binaries of the executable, and the executable inheriting the reputations of the dependent binaries;
    evaluating a total safeness of the executable against a set of thresholds to detect a safeness level of the executable, the total safeness based on at least the backtrace result and a weighted backtrace score determined using a generated dependency importance factor; and
    outputting, on a display screen, the safeness level of the executable.

2. The computer-implemented method as recited in claim 1, further comprising analyzing the executable using the at least one safeness analysis based on gathered program information relating to the executable.

3. The computer-implemented method as recited in claim 2, wherein evaluating the total safeness of the executable is based on the backtrace result and respective results of the at least one safeness analysis, the safeness level being selected from at least one of: safe, unsafe and unknown.

4. The computer-implemented method as recited in claim 1, wherein the at least one safeness analysis comprises comparing a behavior of the executable against predefined lists of suspicious process behavior, file behavior and network behavior.

5. The computer-implemented method as recited in claim 1, wherein the at least one safeness analysis comprises:
    generating an executable signature by a hash function based on the executable; and
    evaluating the executable signature by accessing a database of executable signatures.

6. The computer-implemented method as recited in claim 1, wherein the at least one safeness analysis comprises verifying a developer signature of the executable, the developer signature being generated by a developer of the executable, verifying the developer signature includes accessing a database of developer signatures.

7. The computer-implemented method as recited in claim 1, wherein the at least one safeness analysis comprises conducting one or more anti-virus scans of the executable, each anti-virus scan being conducted by a different anti-virus program.

8. The computer-implemented method as recited in claim 1, wherein the at least one safeness analysis comprises searching known safe software repositories to determine if the executable is hosted thereon.

9. The computer-implemented method as recited in claim 1, further comprising:
  inputting, on a user interface, feedback regarding the safeness level of the executable and storing the feedback in association with the executable;
  adjusting the safeness level of the executable based on the feedback; and
  referring to the feedback associated with the executable during future evaluation of the total safeness of the executable.

10. A system for enhancing cybersecurity in a computer system by detecting a safeness level of an executable, comprising:
  a storage device configured to store program code and program information relating to any type of executable;
  a processor operatively coupled to the storage device and configured to detect a safeness level of the executable by executing program code, stored on the storage device, to:
    identify an installation lineage of an executable, entities forming the installation lineage including at least an installer of the executable, and a network address from which the executable is retrieved;
    analyze, individually, each entity of the entities forming the installation lineage using at least one safeness analysis, results of the at least one safeness analysis of each entity being inherited by other entities in the lineage of the executable;
    determine a backtrace result for the executable based on an inherited safeness evaluation of the executable, the backtrace result being determined by collecting and analyzing reputations of dependent binaries of the executable, and the executable inheriting the reputations of the dependent binaries; and
    evaluate a total safeness of the executable against a set of thresholds to detect a safeness level of the executable, the total safeness based on at least the backtrace result and a weighted backtrace score determined using a generated dependency importance factor; and
  a display screen having a graphical user interface implemented by the processor and displayed on the display screen, the graphical user interface configured to present the safeness level of the executable, and accept feedback overriding the safeness level of the executable.

11. The system as recited in claim 10, wherein the processor further executes program code to:
  analyze the executable using the at least one safeness analysis based on gathered program information relating to the executable.

12. The system as recited in claim 11, wherein the processor evaluates the total safeness of the executable based on the backtrace result and respective results of the at least one safeness analysis, the processor selecting the safeness level from at least one of: safe, unsafe and unknown.

13. The system as recited in claim 10, wherein the processor further executes program code to compare a behavior of the executable against predefined lists of suspicious process behavior, file behavior and network behavior.

14. The system as recited in claim 10, wherein the processor further executes program code to:
  generate an executable signature by a hash function based on the executable; and
  evaluate the executable signature by accessing a database of executable signatures.

15. The system as recited in claim 10, wherein the processor further executes program code to verify a developer signature of the executable, the developer signature being generated by a developer of the executable, the developer signature being verified by at least accessing a database of developer signatures.

16. The system as recited in claim 10, wherein the processor further executes program code to conduct one or more anti-virus scans of the executable, each anti-virus scan being conducted by a different anti-virus program.

17. The system as recited in claim 10, wherein the processor further executes program code to:
  receive, on a user interface, feedback regarding the safeness level of the executable and store the feedback in association with the executable;
  adjust the safeness level of the executable based on the feedback; and
  refer to the feedback associated with the executable during future evaluation of the total safeness score of the executable.

18. A computer program product comprising a non-transitory computer readable storage medium having program instructions embodied therewith, the program instructions executable by a computer to cause the computer to perform a method for enhancing cybersecurity of the computer by detecting a safeness level of an executable, comprising:
  identifying an installation lineage of any type of executable, entities forming the installation lineage including at least an installer of the executable, and a network address from which the executable is retrieved;
  analyzing, individually, each entity of the entities forming the installation lineage using at least one safeness analysis, results of the at least one safeness analysis of each entity being inherited by other entities in the lineage of the executable;
  determining a backtrace result for the executable based on an inherited safeness evaluation of the executable, the backtrace result being determined by collecting and analyzing reputations of dependent binaries of the executable, and the executable inheriting the reputations of the dependent binaries;
  evaluating a total safeness of the executable against a set of thresholds to detect a safeness level of the executable, the total safeness based on at least the backtrace result and a weighted backtrace score determined using a generated dependency importance factor; and
  outputting, on a display screen, the safeness level of the executable.

19. The computer program product as recited in claim 18, further comprising:
  analyzing the executable using the at least one safeness analysis based on gathered program information relating to the executable.

20. The computer program product as recited in claim 19, wherein evaluating the total safeness of the executable is based on the backtrace result and respective results of the at least one safeness analysis, the safeness level being selected from at least one of: safe, unsafe and unknown.

* * * * *